Patented Mar. 24, 1931

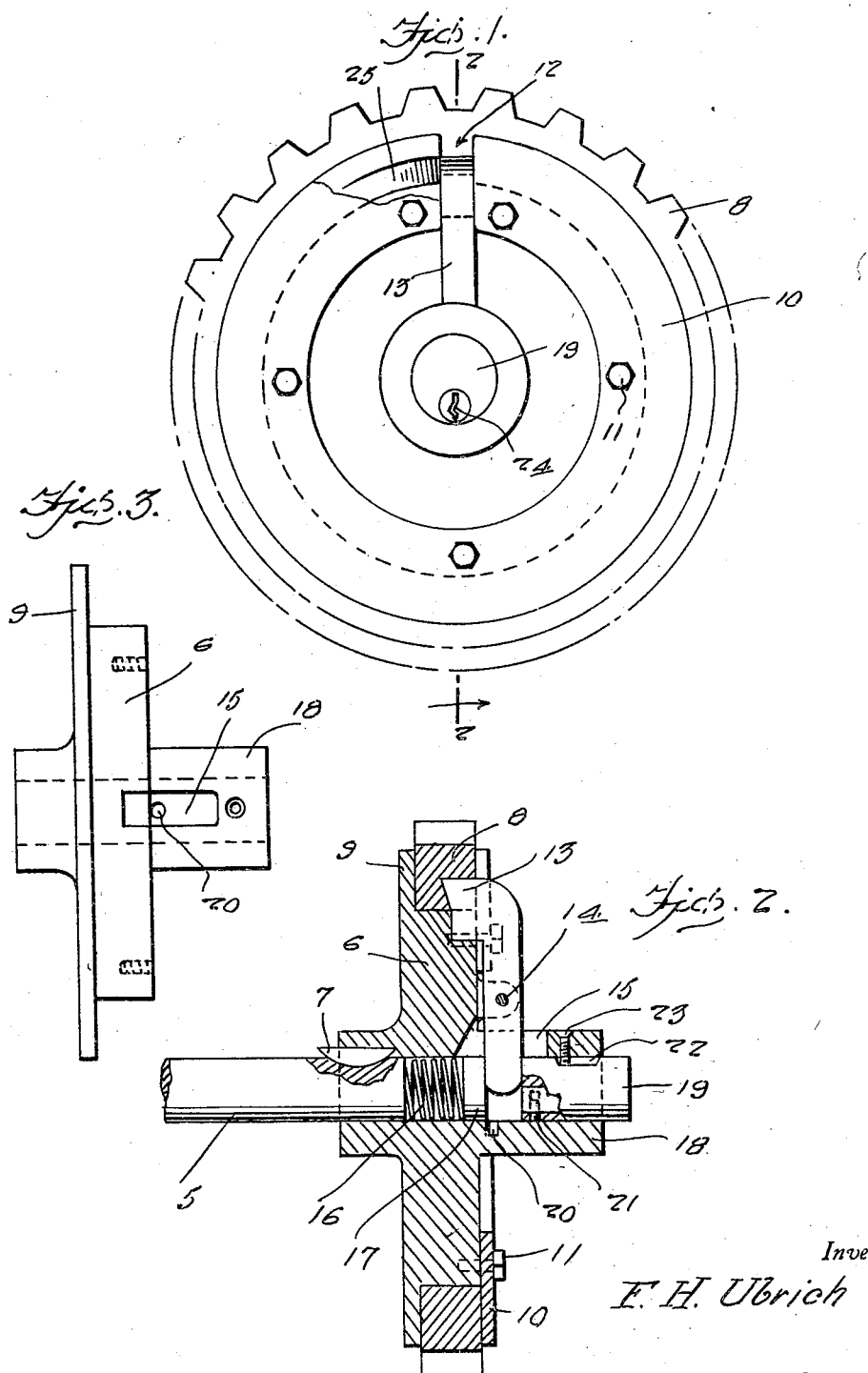

1,798,047

UNITED STATES PATENT OFFICE

FLORIAN H. UBRICH, OF RENSSELAER, NEW YORK

CLUTCH

Application filed April 10, 1928. Serial No. 268,855.

This invention relates generally to means for releasably connecting rotatable shafts and the like and has specific reference to and providing means for releasably connecting rotatable members upon and associated with the internal combustion engine of an automobile.

More specifically, the present invention relates to means for releasably connecting gears to shafts, and has for its principal object the provision of a device of this character adapted for releasably connecting the timing gear upon the cam shaft of the internal combustion engine of an automobile whereby to provide means for releasing the cam shaft gear from operative connection with the shaft, so as to prevent unauthorized operation of the automobile.

A still further object of the invention is to provide a device of this character of a simple and practical construction, which is efficient and reliable in performance, which provides a positive locking connection between the timing gear and cam shaft when desired, and which may be easily and quickly thrown out of locking position whereby to disengage the gear and shaft, which may be mounted in operative position upon the automobile without necessitating any material changes or alterations in the construction thereof, which is relatively inexpensive to manufacture and otherwise well adapted for the purpose for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout.

In the drawings:

Figure 1 is an end elevational view of the cam shaft of an automobile engine with the timing gear shown mounted in position thereon.

Figure 2 is a vertical sectional view through the gear and shaft clutch therefor, taken on the line 2—2 of Figure 1, and Figure 3 is an edge elevational view of the hub keyed for rotation with the shaft and providing a mounting for the timing gear.

Referring now to the drawing in detail, the invention contemplates the provision of a rotatable shaft 5 adjacent one end of which is secured a gear hub 6 by means of a suitable key 7. About the periphery of the hub 6 is arranged a ring gear 8 adapted for engagement with a suitable pinion or other gear, such as for instance the timing gear of an automobile engine. At one edge of the hub 6 is formed a flange 9 engageable with one side of the ring gear 8 and at the other side of the hub is attached an annular removable flange 10 by means of screws or bolts 11 with the edge of said removable flange engageable with the opposite side of the ring gear and cooperating with the flange 9 for retaining the ring gear upon the hub. This construction provides for the relative rotary movement of the ring gear 8 with respect to the hub 6. The removable flange 10 is split transversely as shown at 12 in Figure 1 of the drawing with the split edges thereof disposed in spaced relation and the adjacent side of the hub 6 and gear 8 are provided with recesses adapted to receive one end of a dog 13 pivotally mounted intermediate its ends upon a lug 14 carried by the hub, said dog being disposed radially with respect to the shaft 5 with its inner end inserted in a slotted opening 15 formed in the hollow extension 18 of hub 6. In a central bore of the hub 6 is seated a coil spring 16 with a sliding block 17 interposed between the spring and the inner end of the dog, the spring normally acting upon the dog to retain the outer end thereof within the recesses of the hub and ring gear. The side of the hub 6 provided with the dog is formed with a centrally disposed hollow extension 18 within which is slidably mounted the cylinder lock 19 with its inner end engageable with the side of the dog opposite from the sliding block 17. The outer end of the lock 19 protrudes slightly from the end of the extension 18 and is arranged for manual movement inwardly against the tension of the spring 16 whereby to disengage the outer end of the dog from the recesses of the hub and ring gear. The bore of the hub is formed with a laterally extending recess 20 adapted for engagement with a locking pin 21 carried by the locking cylinder 19 and adapted for movement laterally thereof upon the inward movement of the lock into a position with the pin 21 registrable with the recess 20. It will therefore be seen that upon the movement of the lock 19 inwardly so that the pin 21 will engage the recess 20 the dog 13 will be retained in a disengaged position with respect to the hub and ring gear and thus permit the rotation of the ring gear independent of the hub. The wall of the lock 19 is provided with a longitudinally extending recess 22 adapted for receiving the inner end of a set screw 23 carried by the extension 18 whereby to form a guide for the sliding movement of the lock in order to bring the pin 21 into registry with its associated recess 20. The outer end of the lock 19 is formed with a keyhole opening 24 as shown in Figure 1 of the drawings whereby to provide for the releasing operation of the pin 21 by a suitable key. It will be apparent from the foregoing explanation that upon mounting the hub 6 and associated parts upon the cam shaft of an automobile engine, as represented at 5, and operatively connecting the ring gear 8 with the timing gear of the engine, the valves of the engine will be operatively controlled through the engagement or disengagement of the dog 13, which as heretofore explained forms the operative connection between the hub and the ring gear. Thus by releasing the pin 21 from the recess 20 and permitting the spring 16 to move the dog into engaged position, the hub and ring gear will be connected so as to permit the operation of the cam shaft and enable the engine to function in the usual manner. Upon the movement of the lock 19 inwardly so as to disengage the dog the hub 6 and shaft 5 will be disconnected from the ring gear and it will therefore be impossible to operate the engine because of the inaction of the valve until the lock is released by the proper key provided for this purpose. The face of the ring gear adjacent the edge of the recess for receiving the outer end of the pawl, is inclined as indicated at 25 to facilitate the guiding of the pawl into the recess while the gear is rotating. It is to be understood that the parts, except the entrance to the key hole 24, will be enclosed in a dust proof housing attached in any suitable manner to the timing gear housing forming a part of the usual construction of the engine. It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. An interlocking connection comprising a rotatably mounted shaft having a hub keyed thereon for rotation therewith, a ring gear carried by the hub and normally arranged for independent rotation with respect thereto, said hub and said gear having recesses formed in one edge adapted for alignment at a predetermined period of the rotation of the gear, means for securing the gear in position upon the hub, a dog pivotally mounted intermediate its ends upon the hub and extending radially with respect thereto with the outer end of the dog adapted for insertion in the recesses of the hub and said gear and with the inner end of said dog terminating in a position in longitudinal alignment with the shaft, spring means interposed between the shaft and the inner end of the dog whereby to urge the same into engagement with said hub and said gear and a plunger slidably carried by the hub and arranged for manual movement inwardly against the tension of the spring whereby to move said dog into its disengaged position.

2. An interlocking connection comprising a rotatably mounted shaft having a hub to be keyed thereon for rotation therewith, a flange formed on the hub, a ring gear carried by the flange and normally rotatable independently, a removable ring on said flange for retaining said gear thereon, said hub and said gear having recesses formed in one edge adapted for alinement at a predetermined period of the rotation of the gear, and a dog pivotally mounted intermediate its ends upon the hub, and extending radially with respect thereto, the outer end of the dog adapted for insertion in the said recesses of the hub and the gear and the inner end of said dog terminating in a position in longitudinal alinement with the shaft, a member slidably carried by the hub and adapted to engage one side of the inner end of the dog, and a spring associated with the member and the shaft for moving the dog into engaging position, a plunger pin carried by said hub engageable with the side of the inner end of the dog whereby to move the dog into disengaged position and means associated with said hub and said plunger pin for maintaining said plunger pin in dog releasing position.

In testimony whereof, I affix my signature.

FLORIAN H. UBRICH.